United States Patent [19]
Neugebauer et al.

[11] Patent Number: 4,724,703
[45] Date of Patent: Feb. 16, 1988

[54] MEASURING THE OVERALL DEFORMATION OF A TIRE

[75] Inventors: Juergen Neugebauer, Darmstadt; Vatroslav Grubisic, Reinheim; Walter Diefenbach, Greisheim, all of Fed. Rep. of Germany

[73] Assignee: Fraunhofer-Gesellschaft zur Förderung der angewandten Forschung e.V., Munich, Fed. Rep. of Germany

[21] Appl. No.: 944,543

[22] Filed: Dec. 19, 1986

[30] Foreign Application Priority Data

Dec. 19, 1985 [DE] Fed. Rep. of Germany ....... 3544893

[51] Int. Cl.⁴ .................... B60C 23/02; G01M 17/02
[52] U.S. Cl. .................... 73/146; 73/146.2; 340/58
[58] Field of Search ............... 73/146, 146.2; 116/34 B; 340/58

[56] References Cited

U.S. PATENT DOCUMENTS

| | | | |
|---|---|---|---|
| 1,610,723 | 12/1926 | Waterhouse et al. | 116/34 A |
| 2,378,237 | 6/1945 | Morris et al. | 73/67 |
| 3,869,908 | 3/1975 | Driendl | 73/146.2 |

FOREIGN PATENT DOCUMENTS

| | | |
|---|---|---|
| 3137248 | 6/1982 | Fed. Rep. of Germany . |
| 3301173 | 7/1984 | Fed. Rep. of Germany . |
| 1479442 | 7/1977 | United Kingdom . |
| 2056144 | 3/1981 | United Kingdom . |

OTHER PUBLICATIONS

Clark, "Mechanics of Pneumatic Tires", 8-1981, Seiten 541 577-584 Thieme et al, U.S. DOT, Washington, D.C.

Primary Examiner—Donald O. Woodiel
Attorney, Agent, or Firm—Ralf H. Siegemund

[57] ABSTRACT

The overall deformation of a tire is measured by using two reference points in different parts of or at least in close proximity to different parts of the rim of the wheel, the reference points are spaced apart in a direction transversely to the plane of rotation of the tire; two transducers are respectively connected to the reference points and to the same particular point on the inside of the tire opposite the running surface to establish a triangle in a cross sectional radial plane of the tire; each of the transducers includes a force sensing element responsive to the change in distance between the respective reference point and the measuring point; the transducers further including tension springs to establish mobility as between the measuring and reference points.

8 Claims, 2 Drawing Figures

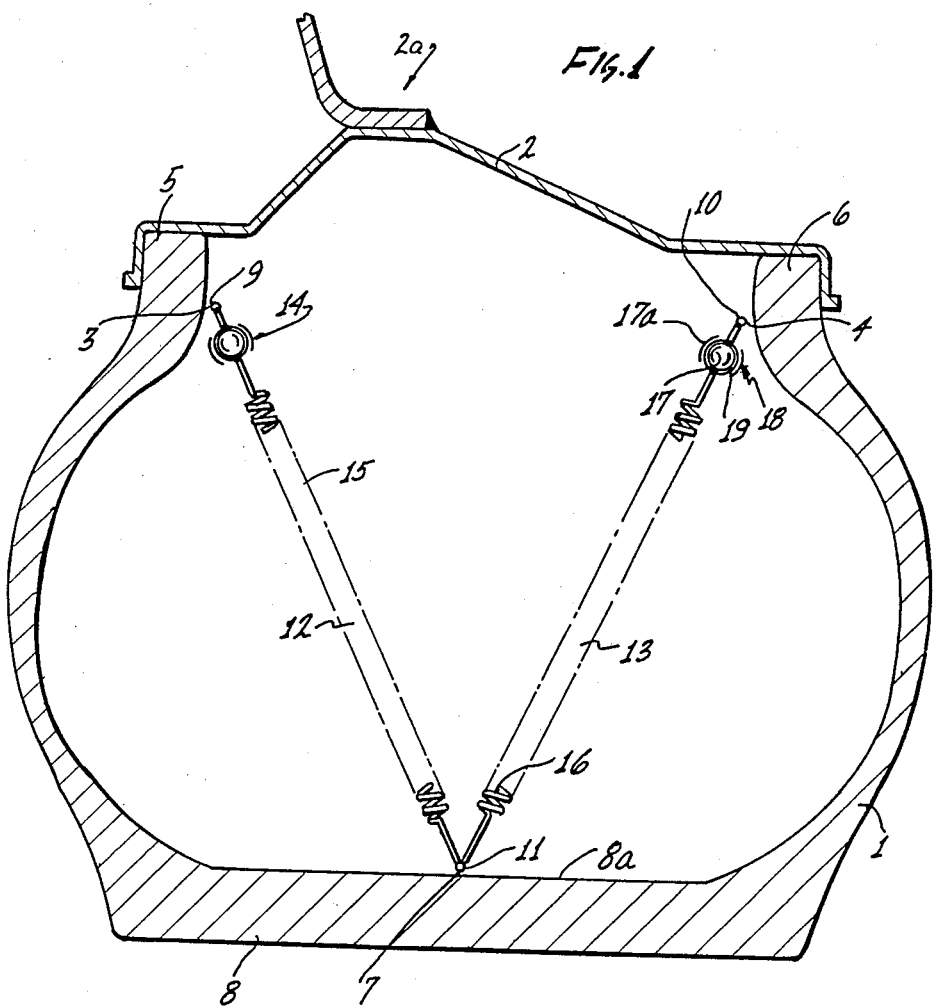
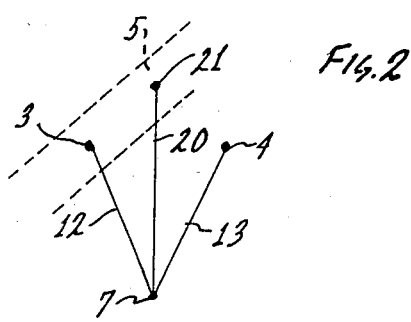

MEASURING THE OVERALL DEFORMATION OF A TIRE

BACKGROUND OF THE INFORMATION

The present invention relates to the measurement of the overall deformation of a tire particularly during use i.e. while the respective vehicle of which the tire is a part is being driven. The invention also relates to the measurement of the overall deformation of a tire in such a manner that distance changes that occur in a cross-sectional plane and relative to a representative reference point whereby the reference point and a measuring point are located inside the tire, and distance changes are specifically ascertained through an appropriate transducer. In addition the invention relates to a series arrangement of a force measuring transducer and of an elastic member in general.

The stiffness of a tire i.e. its vertical and lateral resilient reaction are important factors particularly for passenger comfort and vehicle handling but also for the life of the tire. For optimizing the design of a tire its vertical and its lateral deformation during use has to be ascertained in appropriate test runs and even at high speeds.

H. C. A. van Eldik of the U.S. Department of Transportation has published a textbook "Mechanics of pneumatic tires" under DOT H5 805952 of August, 1981 and page 577 refers to a method of measurement as alluded to in the introductory paragraph. Herein a flexible cable or rope is used and put under tension by a spring while one end is connected to the center of the inside surface of the tire, opposite the running surface while its other end is connected a potentiometer mounted in turn on the rim. In the case of a vertical deformation the cable adjusts the potentiometer and the commensurate modification of the tapped resistance serves as measuring value for the deformation of the tire. This approach is disadvantaged by the fact that the potentiometer will respond to also lateral deformations even though there are no vertical deformations or in the case of a combination deformation the vertical and lateral components of the tire deformation can really not be separated to the requisite degree.

German printed patent application No. 33 01 173 describes a device for acquiring the belt positions in a pneumatic tire wherein the belt itself is capable of detuning an electric oscillating circuit (11 in the reference) which in turn controls an indicator. In particular, the oscillating circuit is varied in dependence upon the angular (azimuthal) inclination of the steel cable of the belt cable 8 in that reference. This way then permits ascertaining of the correct position of the steel wires 8 of the belt particularly during tire manufacturing. Thus this publication refers to quality control of the manufacturing process. Such a control is, of course, necessary since one wants to check whether the belt layers are properly positoned, bearing in mind that often manual labor is involved in the making of such a tire. It is clearly a disadvantage if these belt layers and cable laterally shift during the manufacture.

German printed patent application No. 31 37 248 (based on U.S. patent application Ser. No. 188,707 of Sept. 19, 1980) discloses a method for predicting variables in a tire whereby a tire is rotated relative to a first measuring equipment and any lateral deflection on one side of the tire is measured in a position between the area of maximum cross-section (SD) and the outer radial surface. The tire is also rotated relative to a second measuring device to ascertain lateral deflection of the other side of the tire and with reference to a second position which basically has the same radius as the first mentioned position. In order to acquire the tire variable of interest one ascertains the first harmonics for the deflections in each of the peripheral positions and adds them up for different peripheral positions around the tire. This method basically provides for a scanning of any lateral deflection of the tire so that only certain areas of the outer tire wall are in fact monitored, but not the running surfaces of the tire nor internal deformations. Moreover the two measuring equipments used in that method are stationary as the tire rotates so that no measurement occurs as between the tire on one hand and the rim of the wheel on the other hand.

Independent from the foregoing and unrelated to the measurement of tire deformations, equipment is known in which force per se is measured in conjunction with a positioning spring. For example, German printed patent application Nos. 33 09 524 and 10 68 911 as well as German Pat. No. 958,511 describe measuring transducers in which a series arrangement is provided between a force measuring element and an elastic member. In all of these cases one uses the force measurement for ascertaining a compression or a tension force as such.

DESCRIPTION OF THE INVENTION

It is an object of the present invention to provide a new and improved equipment for ascertaining and measuring overall deformations of a tire particularly during operation and under particular consideration of distance variations that occur within a cross-sectional plane of the tire with emphasis on using the wheel rim as reference.

It is a particular object of the present invention to provide a new and improved method and equipment for measuring the vertical as well as the lateral deformation of a tire during operation; the measurements to permit separation of the respective values such that vertical and lateral deformations can be ascertained independently from each other.

In accordance with the preferred embodiment of the present invention, the objects are attained by selecting a measuring point inside the tire, preferably on the inside center opposing the running surface, and determining vertical as well as lateral shifts of that measuring point relative to two, spatially separated reference points either right on the wheel rim or closely thereto; these reference points are inside the tire and together with the measuring points establish a triangle within the cross-sectional plane of the tire. Fastening elements are provided in each of these points and the measuring point is resiliently linked separately with the two reference points under inclusion of two measuring transducers, one for each linkage path.

The method in accordance with the invention offers the advantage that indeed vertical as well as lateral deformations can be ascertained during static operation as well as while the tire runs. This is a significant aid for optimizing contour and construction of a tire. The transducers are elements which ascertain the force acting upon them and the measuring signal is a signal indicating displacement of the measuring point vis-a-vis one or the other reference point.

However, force is not measured as such (as per the several references mentioned in the last paragraph of the introduction), rather one relies on a monotonic, preferably linear force-displacement characteristic of this transducer suspension. Thus, in accordance with the invention, the measuring signals are directly indicative of a physical displacement of the measuring point vis-a-vis the respective reference point. It is believed to be that specific aspect which permits independent extraction of vertical and lateral displacement values of the measuring points, in particular in relation to the rim as such. The reference points are preferably points right at the beads in relation to which the tire is fastened to the rim element. The elastic suspension members are preferably linear ones and one will use preferably a tension spring which in operation is under tension. The forcce measuring element is preferably a hollow tubular element or short sleeve being provided with a tension gauge-like strip, and being made of a high strength sheet. If necessary one may provide a third measuring path between the measuring point and a rim side reference point which however is not situated in the plane defined by the first mentioned three points. This feature permits ascertaining, as an error compensating component, azimuthal displacement of the measurement, out of the normal radial plane established by the two reference points, and the measuring point through the wheel axis.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

FIG. 1 illustrates a cross-section through a tire with rim and measuring equipment in accordance with the preferred embodiment of the present invention for practicing the best mode thereof; and FIG. 2 is a schematic perspective showing for a supplemental transducer.

Proceeding to the detailed description of FIG. 1 in the drawings the tire is denoted by reference numeral 1 which is mounted in the usual fashion by means of its beads 5 and 6 to the rim element 2 of wheel 2a. Two reference points, 3 and 4, are defined and establish inside the tire, on the beads 5 and 6, and in immediate vicinity to the rim element 2. These two reference points 3 and 4 are symmetrical in relation to a center plane through the tire that runs transversely to the axis of wheel 2a. The points 3 and 4, moreover, face each other along a (hypothetical) horizontal line which, so to speak, establishes a first or base line of a triangle.

A measuring point is provided centrally on the inside surface 8a, opposite to the running surface 8 of the tire. Owing to the symmetry one establishes, therefore, an isosceles triangle with hypothetical lines 3-7 and 4-7 representing the legs of that triangle. The two reference points 3 and 4 are specifically established through two articulating fastening elements 9 and 10 respectively. There is analogously a fastening element 11 in the point 7 and establishes the measuring point 7 therewith. Between the reference point 3 and measuring point 7 there is provided a first measuring transducer 12 while a second, similar transducer 13, also to be understood in the general sense, is provided between the reference point 4 and the measuring point 7. The transducers 12 and 13 include, respectively, tension springs 15 and 16, and they also include force sensing elements 14 and 18, respectively.

The force measuring element 14 and 18 are in each instance made of a hollow sleeve such as 19 carrying tension measuring strips as gauges 17 and 17a, respectively. The connections by and to fasteners 9 and 10 are movable in the sense that one can understand the connections as being articulated ones in each instance. The springs 15 and 16 provide additional displaceability and articulation. The springs 15 and 16 are tension biased corresponding to the expected deformation of the tire.

It can thus be seen that the three points 3,4,7 establish a triangle whose geometry generally is ascertainable. That triangle is situated in a plane (plane of the drawing) which extends radially and runs through the axis of the wheel. Deviation from the isosceles type of configuration which defines the normal, unloaded situation, as far as the tire is concerned, represent vertical and horizontal tire deformations. Vertical tire deformation causes the points 7 to move along the height of the triangle and leads to similar shortenings or elongations of the legs of that triangle. Lateral deformations are ascertained as deviations of the triangle from the isosceles configuration.

The elastic members 15 and 16 are presumed to have a linear force-displacment characteristics. Therefore, the force measuring elements 14 and 18 yield signals that are, respectively, proportionate to the displacement i.e. to the changes in length of the two legs of the normally isosceles triangle. Suitable sliders or the like are provided on the wheel axle hub arrangement to extract the respective electrical signal from the force measuring transducer 14 and 18 and they will be made available outside the tire. Owing to the fact that the geometry of the entire arrangement in the undeformed state is known and through suitable calibration of the measuring elements 14 and 18 one can, therefore, generate from the output signals further and measuring values that are indicative of the changes of geometry of the triangle. On the basis of geometric relations one can separate the two components i.e. vertical versus horizontal deformation through simple calculations which can be carried out, e.g. in the measuring instrument itself, through analog or digital circuitry.

The application of the inventive method procedure and equipment does not make it necessary in principle to use an isosceles triangle. The selection of the center of the inside surface 8a of the running surface 8 is not essential in principle as long as the geometry of the triangle in the normal undeformed state is adequately known and, again, through calculations, the lateral and vertical displacements can be analogously obtained. An isosceles triangle simply establishes particularly simple geometric relationships from which to proceed. Decisive is the fact that during measurements and when significant deformations do occur or are expected to occur, the measuring transducers are not interfered with as far as their mobility is concerned in the sense that the resulting geometry is no longer as straight forward as expected. On the other hand selection of different geometries and geometric relaitonships may permit in cases the conduction of certain special conditions and situations; it may be of interest to measure the displacement of different points of the tire. In the example the measured displacement is that of the rim element vis-a-vis the inside center of the running surface. This is the most important aspect as far as the tire is concerned but for refinement purposes other points on the tire may become of interest and the inventive method is easily adaptible throug relocating the measuring point.

It should be mentioned that strictly speaking the desired measurement is to be taken with reference to the rim part of the wheel so that the reference points should be at the rim. On the other hand just upon looking at the drawing it is apparent on its face that the fastening procedure for the transducers 12 and 13 to the tire as well as to the rim proper would be a formidable task and a rather complicated aspect. Using therefore fastening points as reference points which are on the tire itself is somewhat of a compromise. On the other hand, it can be seen that the reference points are actually chosen in that, for practical purposes, they are immobilized by the immediate abutment of the heads 5, 6 against the rim 2 at a thick, even the thickest part of the tire so that in fact the measuring results are at worst falsified by higher order errors.

Another aspect is that during high speeds the tire is acted upon centrifugal force. This force has the tendency of extending the two legs of the triangle. In accordance with a further improvement this tendency can be compensated in the following manner. For example a mechanical very light weight transducer or an electrical transducer under utilization of a bridge circuit can be used to ascertain separately the centrifugal force as it arises and the result is then used that as a corrective value.

Another aspect is the following, and schematically shown in FIG. 2. In addition to the vertical and lateral tire deformation which one wants to ascertain it may be of interest to measure during acceleration or deceleration a migration of the point 7 in the running direction of the tire that is transversely to the plane established by the normal triangle, but in the plane of wheel rotation. This obtains through the utilization of a further measuring transducer 20 also having one end connected to the measuring point 7 but using as a reference some other point, 21, on the rim or one of the beads, outside of the plane of the drawing of FIG. 1; points 3 and 21 in FIG. 2 are spaced azimuthally on bead 5. This third transducer in conjunction withe the others will therefore provide a value indicative of this transverse displacement component.

The invention is not limited to the embodiments described above, but all changes and modifications thereof, not constituting departures from the spirit and scope of the invention are intended to be included.

We claim:

1. A device for measuring the overall deformation of a tire being mounted on a rim of a wheel, comprising in combination:
    means for establishing a first and a second reference point in different parts of, or in proximity to different parts of the rim, said reference points being spaced apart at least predominantly in a direction transversely to a plane of rotation of the tire;
    a first and a second transducer respectively connected to said first and second reference points, and to a particular point on the inside of the tire to establish a triangle situated in a cross-sectional plane of the tire which cross-sectional plane runs in a radial plane through the axis of the wheel;
    each of said transducers including a transducer element responsive to a change in distance between the respective reference point and said measuring point; and
    each of said transducers being further constructed to establish mobility of the respective transducer element as between the measuring point and the respective reference point.

2. The device as in claim 1 wherein the measuring point is on the inside surface and on the center opposite the running surface of the tire.

3. Device as in claim 1 said reference points being established on beads of the tire adjacent to the rim.

4. Apparatus as in claim 1 said transducer element in each instance being a force measuring element with a linear force-displacement characteristics.

5. Device as in claim 4 each said transducer including a linearly reacting elastic element.

6. Device as in claim 5 said elastic element being a tension spring.

7. Device as in claim 4 said force measuring element in each instance being a hollow sleeve of small height made of high strength sheet metal and provided with a tension measuring strip.

8. Device as in claim 1, including a third transducer connected to the measuring point and to a reference plane outside of the plane as defined by said triangle, for ascertaining displacement of said measuring plane from said plane as running through the axis of the wheel.

* * * * *